(12) United States Patent
Hughes et al.

(10) Patent No.: US 6,839,704 B2
(45) Date of Patent: Jan. 4, 2005

(54) INFORMATION STORAGE, RETRIEVAL AND DELIVERY SYSTEM AND METHOD OPERABLE WITH A COMPUTER NETWORK

(75) Inventors: Kent Hughes, Austin, TX (US); Tony Benton, Dallas, TX (US)

(73) Assignee: TrialSmith, Inc., Austin, TX (US)

(*) Notice: Subject to any disclaimer, the term of this patent is extended or adjusted under 35 U.S.C. 154(b) by 67 days.

(21) Appl. No.: 10/396,761

(22) Filed: Mar. 25, 2003

(65) Prior Publication Data

US 2003/0195876 A1 Oct. 16, 2003

Related U.S. Application Data

(63) Continuation of application No. 09/411,149, filed on Oct. 1, 1999.
(60) Provisional application No. 60/102,713, filed on Oct. 1, 1998.

(51) Int. Cl.[7] .............................................. G06F 17/30
(52) U.S. Cl. ............................................. 707/3; 707/5
(58) Field of Search ............................... 707/1–5, 9–10, 707/102

(56) References Cited

U.S. PATENT DOCUMENTS

| | | | |
|---|---|---|---|
| 5,737,592 A | 4/1998 | Nguyen et al. | |
| 5,768,528 A | 6/1998 | Stumm | |
| 5,778,367 A | 7/1998 | Wesinger, Jr. et al. | |
| 5,802,518 A | * 9/1998 | Karaev et al. | 707/9 |
| 6,078,916 A | * 6/2000 | Culliss | 707/5 |
| 6,484,162 B1 | 11/2002 | Edlund et al. | |

* cited by examiner

*Primary Examiner*—Alford W. Kindred
(74) *Attorney, Agent, or Firm*—Jenkens & Gilchrist

(57) ABSTRACT

A system and method for collecting, indexing, searching, accessing and downloading data over local and global computer networks. Data is reposed in a central database, indexed and interrelated by attributes characteristic of the data type. The data includes objects such as documents, queries, attribute lists and the like. The data is indexed and managed using a relational database management system (RDBMS). The central database and the RDBMS reside in a server that can be coupled to the global network through a network/user interface. Queries received by a user are converted to a format understood by the RDBMS. Objects can be returned as an image file for viewing, and can be purchased for downloading. Content to the database may be provided by individuals or proprietors of other databases, either on the network or through direct input to the server. Content to the database can also be self-generated by the RDBMS.

6 Claims, 10 Drawing Sheets

INFORMATION STORAGE, RETRIEVAL AND DELIVERY SYSTEM AND METHOD OPERABLE WITH A COMPUTER NETWORK

CROSS-REFERENCE TO RELATED APPLICATION

This application is a continuation of U.S. patent application Ser. No. 09/411,149, filed Oct. 1, 1999, which claims benefit of U.S. Provisional Application Ser. No. 60/102,713 filed Oct. 1, 1998. Both of these applications are hereby incorporated herein by reference in their entirety, including the Appendix thereto containing a source code listing.

COPYRIGHT NOTICE

A portion of the disclosure of this patent document contains material which is subject to copyright protection. The copyright owner has no objection to the facsimile reproduction by anyone of appropriate sections of this document or disclosure as it appears in the US Patent and Trademark Office file or records, but otherwise reserves all copyright rights whatsoever.

BACKGROUND OF THE INVENTION

1. Field of the Invention

The present invention relates generally to database management systems. More particularly, the present disclosure is directed to systems and methods for information storage, retrieval and delivery using a relational database operable with a computer network such as the Internet and the associated World Wide Web (WWW).

2. Description of Related Art

Current computer technology allows information, for example, documents, records, etc., to be distributed electronically. Electronic distribution is generally cost effective when compared with conventional hard copy distribution methods. Moreover, electronic distribution generally permits faster transmission of information to users interested in such information. Global computer networks, such as the Internet, enable information to be distributed to a wide range of people at locations around the world. One of the many advantages of the Internet, particularly the World Wide Web (WWW or the "Web"), is that the communication protocols used for transmitting documents and other information are non-proprietary, thereby enabling end users to access and use the Internet without the need for highly customized hardware or software.

One of the areas where information production and distribution has assumed an overwhelming importance is the legal profession, especially the litigation practice. It is well-known that in this area there is a tremendous need for systems where a user, typically a legal professional (e.g., an attorney), can inexpensively access, exchange and store documents critical to various aspects of litigation research. Moreover, such user interaction must be secure and reliable.

Of valuable consideration in litigation research, often, is whether there are other legal professionals who might have experience in a particular aspect of a litigation matter in which a user is currently interested and if there exists any documents relating to that matter provided by the legal professional. Such documents may typically comprise depositions, briefs, pleadings, seminar papers, etc. Another consideration, certainly, is whether the user can quickly access and download relevant documents, with or without any fees associated therewith.

A further consideration in litigation research frequently relates to the arena of expert witnesses. Clearly, it would be highly useful for legal professionals if they could inexpensively access relevant information about a particular expert who has testified in the area that is related to the matter of interest. Another useful feature would be where a party (that is, a legal professional or an entity that contributed or provided a document in a common electronic exchange) possesses the capability to know if other legal professionals have accessed its document.

Often, an information provider operating an electronic exchange of information wishes to provide information to users on a controlled basis. For example, the provider may want to provide information only to those users who have paid a fee or completed a registration process. Also, the provider may want to restrict access to certain types of information to certain classes of users. Additionally, the information provider or the users may require that the format of the information provided to one user be different from the format of the same information provided to another user or class of users.

It can be readily appreciated by those skilled in the art that an electronic exchange of information may be advantageously provided, especially with particular relevance to the subject matter set forth herein above, using the Internet and a centralized database coupled therewith. Whereas there has been a fast growing demand for Internet/Web access to databases, there are no extant systems that provide the unique and useful features of the present invention as described herein below.

SUMMARY OF THE INVENTION

To alleviate the above described problems with existing systems and other problems recognized by those skilled in the art, an exemplary embodiment of the present invention includes a computerized method and a system for data management. In a particular exemplary embodiment, the computerized method for data management includes the steps of: receiving a first query from a first user; receiving a first user identity indicator; storing the first query and the first user identity indicator in a first database; receiving a second query from a second user, the second query including at least a portion of the first query; searching the first database according to the second query; and responsive to searching the first database, returning the first query and the first user identity indicator.

In another embodiment, the computerized method can perform the steps of receiving a document from a third user; receiving a third user identity indicator; and storing the document in association with the third user identity indicator.

In yet another embodiment, the method can perform the steps of presenting the first query to a second database, the second database including the document; and providing the document to the first user responsive to the first query corresponding to the document.

Another exemplary embodiment can perform steps of adjusting an indicator value associated with the third user, whereby the indicator value indicates that the document received from the third user has been provided to the first user.

Moreover, one exemplary embodiment can include the step of calculating a royalty based upon the indicator value associated with the third user. In should be noted, however, that the present invention can include any combination of the above features or any other features as described herein.

BRIEF DESCRIPTION OF THE DRAWINGS

A more complete understanding of the present invention may be had by reference to the following detailed description when taken in conjunction with the accompanying drawings wherein.

DETAILED DESCRIPTION OF AN EXEMPLARY EMBODIMENT

The numerous innovative teachings of the present application will be described with particular reference to the presently preferred exemplary embodiments, especially taken in conjunction with the source code listing incorporated herein from Provisional Application Ser. No. 60/102,713. However, it should be understood that this class of embodiments provides only a few examples of the many advantageous uses of the innovative teachings herein. In general, statements made in the specification of the present application do not necessarily limit the scope hereof. Moreover, some statements may apply to some inventive features but not to others.

Figure 1:
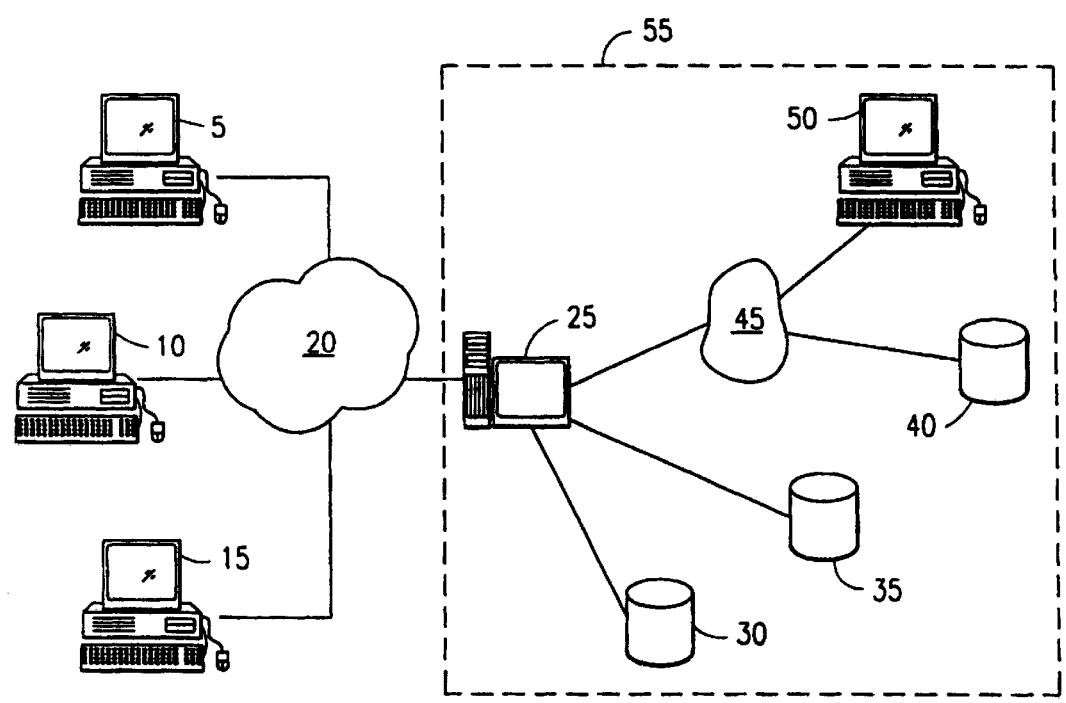
FIG. 1 illustrates one embodiment of the present invention operable on an exemplary platform.

Referring now to FIG. 1, there is illustrated one embodiment of the present invention operable on an exemplary hardware platform. Users 5, 10, 15 on variable hardware platforms connect through a network 20, e.g., the Internet, to a server 25 that is connected to various storage devices 30, 35. Furthermore, the server can be connected to another network 45, e.g., a LAN, that has associated computers 50 and storage devices 40. The server 25, storage devices 30,35, network 45, and the associated computers 50 and storage devices 40 are herein collectively referred to as the "system" 55. One skilled in the art, however, can readily understand that the configuration of the system 55 as shown in FIG. 1 is only exemplary and can be configured in a multitude of ways.

In operation, a user, e.g., user 10, can utilize one embodiment of the present invention by accessing the server 25 through the network 20. The user 10 can request to view data that is stored on one of the storage devices, e.g., storage device 40. In one embodiment, the user 10 can provide data to the system 55 and this data will be stored in a database at one of the storage devices 40. This stored data then may be available to other users, e.g., users 5 and 15.

Figure 2:
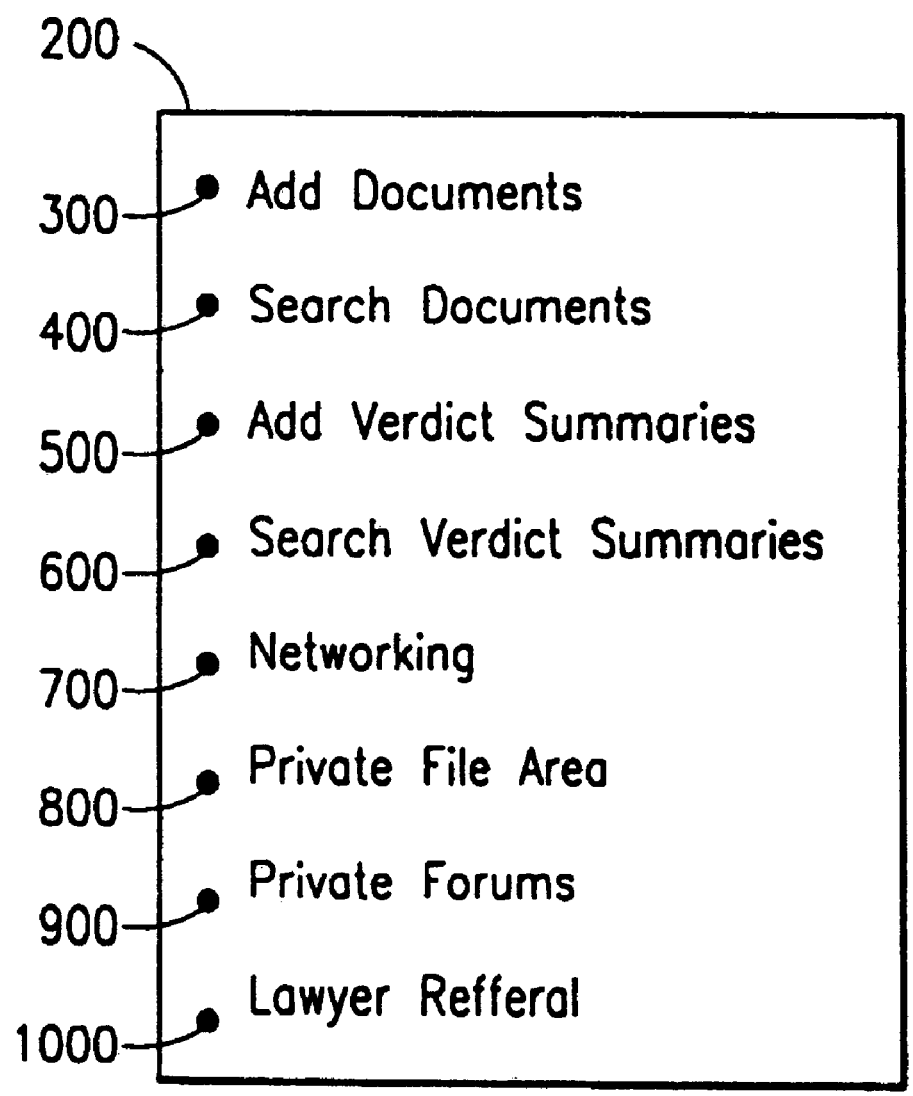
FIG. 2 is a directory of the various selectable features illustrated in more detail in FIGS. 3–10.

Now referring to FIG. 2, there is illustrated a directory 200 of the various selectable features illustrated in more detail in FIGS. 3–10. This directory 200, or at least some form thereof, may be presented to users that access the system 55. A user, e.g., user 5, can select one or more of the various selectable (shown in FIG. 2) features and cause certain associated instructions to be executed. Exemplary embodiments of these instructions are described with relation to FIGS. 3–10.

Figure 3:
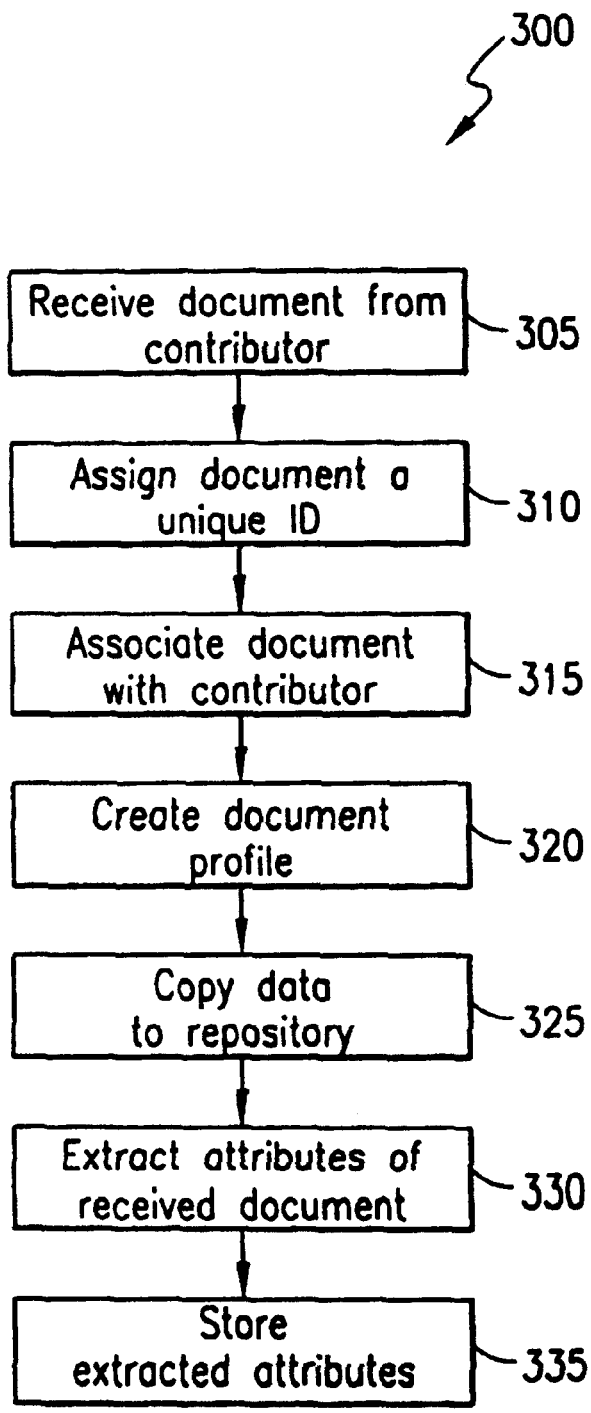
FIG. 3 illustrates the "Add Documents" selectable feature.

Now referring to FIG. 3, there is illustrated the "Add Documents" selectable feature 300 of the exemplary embodiment of the present invention. This feature allows users (entities, organizations, individuals, etc) to contribute information to the main database stored at one or more of the storage devices 30, 35, 40. For example, after selecting the "Add Documents" feature, a user can provide documents or other data (collectively, the "documents") to the system 55. The data can be in any form including ASCII text, WordPerfect (TM) text, etc. In one embodiment, an administrator for the system receives (step 305) the documents/data in a hard-copy (possibly through the mail). The administrator then must initiate a process for scanning the material or otherwise making the material available to the system 55 in a digital form. Upon receiving the documents (or converting them to digital form), a unique identification number can be assigned (step 310) to each document. Moreover, the documents can be associated (step 315) with the user that contributed them. The documents then can be stored (step 325) at a central repository, such as storage device 30. In one embodiment, a legal disclaimer is automatically associated and stored with each document.

Concurrently, or at least generally concurrently, a document profile, i.e., abstraction, is created (step 320) for each document that is received from the user. This profile is subject to both manual and automatic updating. Moreover, in one embodiment, certain elements included in the profile are automatically identified and extracted (step 330) from the document. These extracted elements are then loaded into the profile and stored (step 335). Other elements of the profile may be manually provided by the user submitting the document or an editor reviewing the document.

The document profile can contain various elements (i.e., fields), including but not limited to plaintiff lawyer ID, contributing party, defense lawyer ID, defense lawyer's name, plaintiff lawyer's name, style of case, expertise area, notes, state code, type of document (deposition and leads, brief and pleading) legal forms, seminar papers, verdicts, third party resources, search-ability of document, authorization flags, originator, etc. Among other things, this document profile aids users in locating the particular document and aids the system 55 in managing the document.

Figure 4:
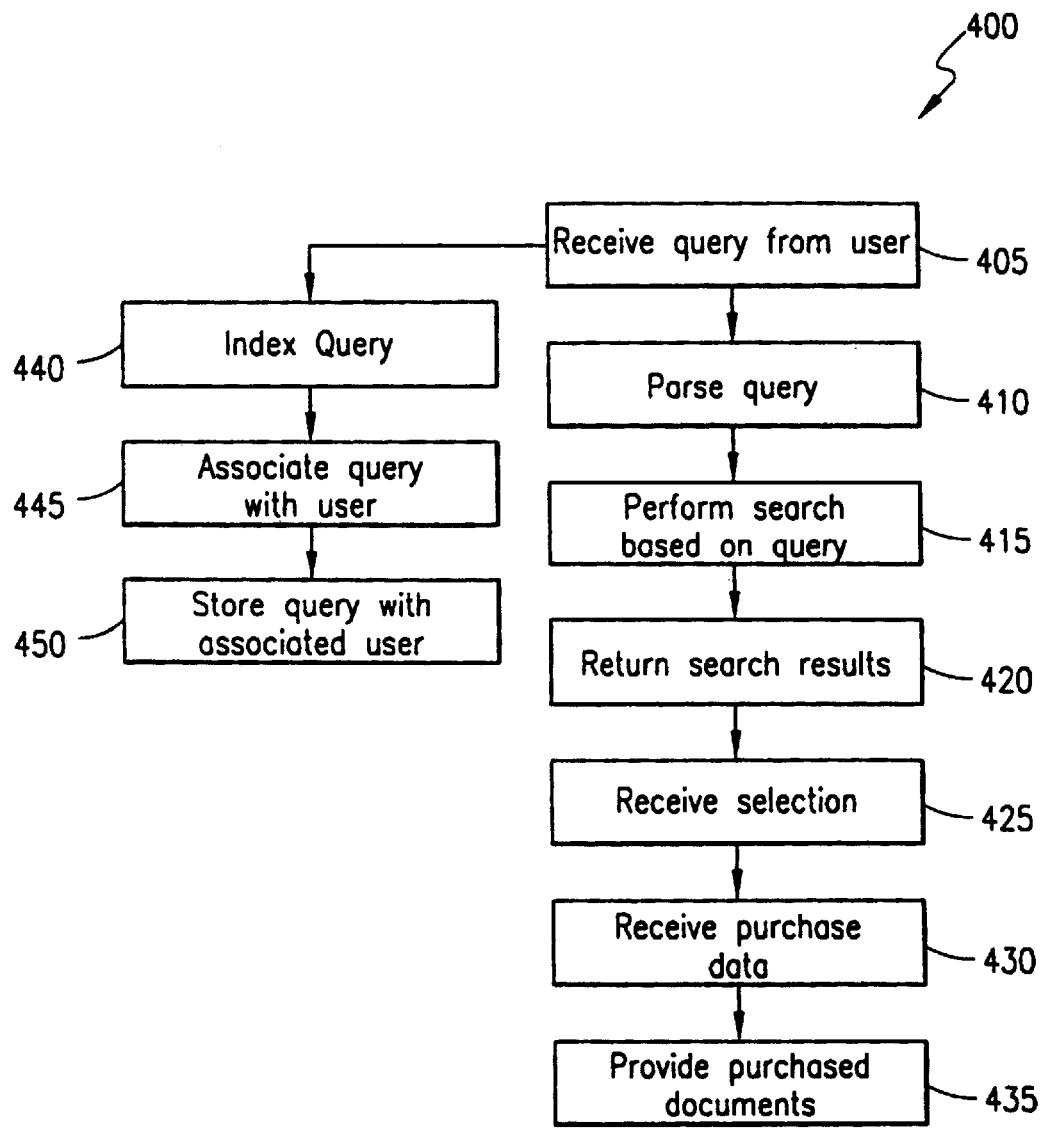
FIG. 4 illustrates the "Search Documents" selectable feature.

Referring now to FIG. 4, there is illustrated the "Search Documents" feature 400. A user (or a system administrator acting on behalf of a, for example, phoning party) can select the "Search Documents" feature 400 from a menu (shown in FIG. 2) and then transmit a query that is received (step 405) by the system. In one embodiment, the query is in a free-form, i.e., full text search query. In another embodiment, the query is in the form of responses to particular fields. For example, the user may be prompted to fill in one or more search criteria (fields) such as style of case, defense lawyer, etc. Moreover, the user can select a particular database (or particular portions of a single database) in which to have the search performed. That is, the user can limit any search to, for example, depositions, briefs, verdicts, rulings, experts, etc. Alternatively, the user can select to perform a full site (power) search and search all of the records stored on the system whether they are briefs, verdicts or other.

After the query is received by the system, the query is parsed (step 410) into search terms and operators (and, or, etc.). The search terms and any relevant operators are then used to perform a search (step 415) of the records stored in the system. If the user previously selected a particular database, the search can be limited to run in only that database—thereby preserving processing resources.

Assuming that the search returns matching records, these matching records, or at least summaries thereof, are displayed (step 420) for the user to browse. In one embodiment, the user can select (step 425) a particular record from the displayed record summaries. The user can then be prompted for payment information or if the user has an account, payment can be automatically processed (step 430). The selected document is then made available (step 435) to the user through, for example, email, fax, download, etc. Moreover, the records associated with the purchased documents can be updated to reflect that the particular document was purchased and by whom it was purchased. The party that contributed the document (i.e., the document owner) can review this information at any time.

Additionally, the purchasing user's account may be altered to indicate that the particular document was purchased. If the user selects the document again, the users account can be checked to see that the document was already purchased, and the user can download/view the document again for free.

In one embodiment, the user's query that is received by the system is indexed (step 440), associated (step 445) with the particular user and stored (step 450). These queries can be searched in much the same fashion as the primary information. For example, queries could be searched by particular terms, originating users, date of query, etc. Thus, a user can search or even browse his own queries or, in one embodiment, the queries of other users.

In yet another embodiment, documents are not received from individual users but rather from outside services that catalog and store information. That is, documents may be collected by an outside service and provided in bulk for processing by the system. The process for managing the documents once received, however, is generally the same as if the documents are received from individual users or outside services.

Figure 5:
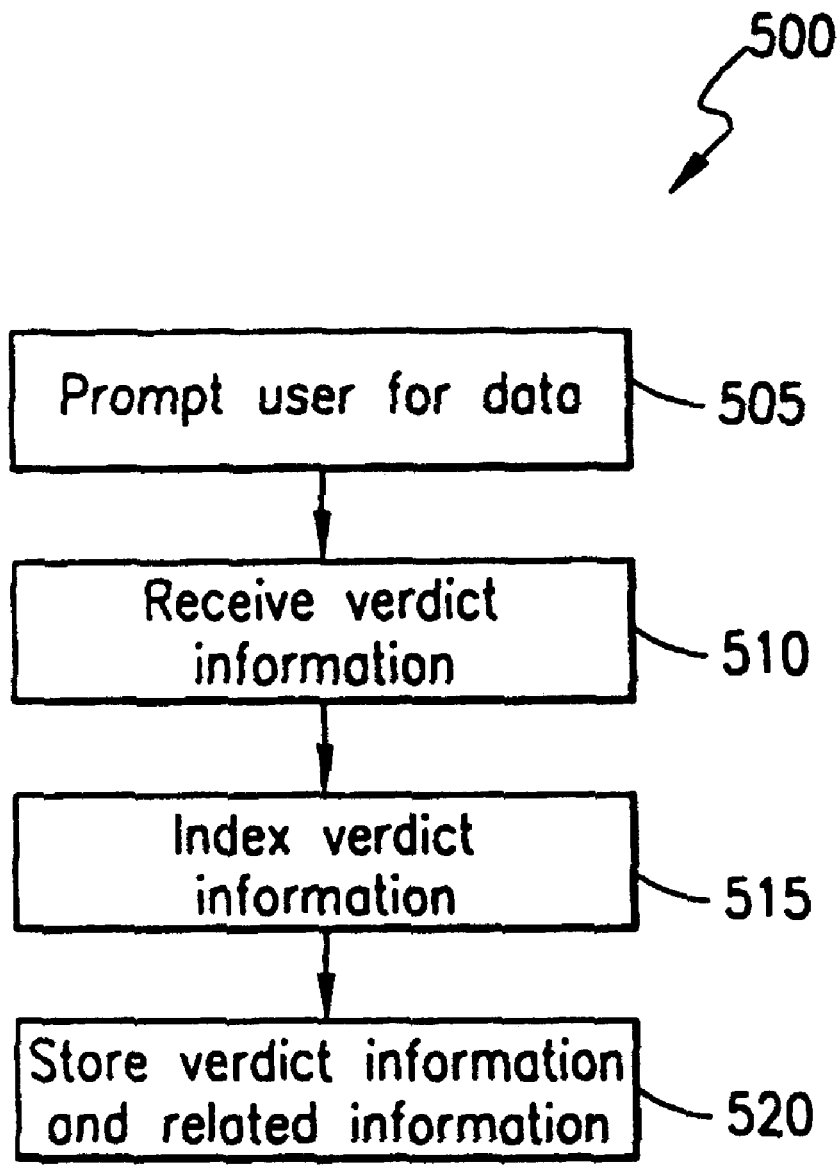
FIG. 5 illustrates the "Add Verdict Summaries" selectable feature.

Referring now to FIG. 5, there is illustrated the "Add Verdict Summaries" selectable feature 500. The "Add Verdict Summaries" feature allows users to add verdicts, related information, and comments thereabout to the system. Initially, the user is prompted to enter relevant information (step 505). The user can be prompted in a variety of forms including, but not limited to, filling out fields in a form, entering free-form information, etc. After the necessary information is received (step 510), attributes of the information are identified and the information is indexed (step 515). The information is then associated with the index and stored (step 520) so that it can be searched.

In one embodiment, verdict summaries are received from an outside service that is responsible for reviewing cases and writing the summaries. When verdict summaries are received from such an outside source, they can be indexed and stored as if they were received from an individual user.

Figure 6:
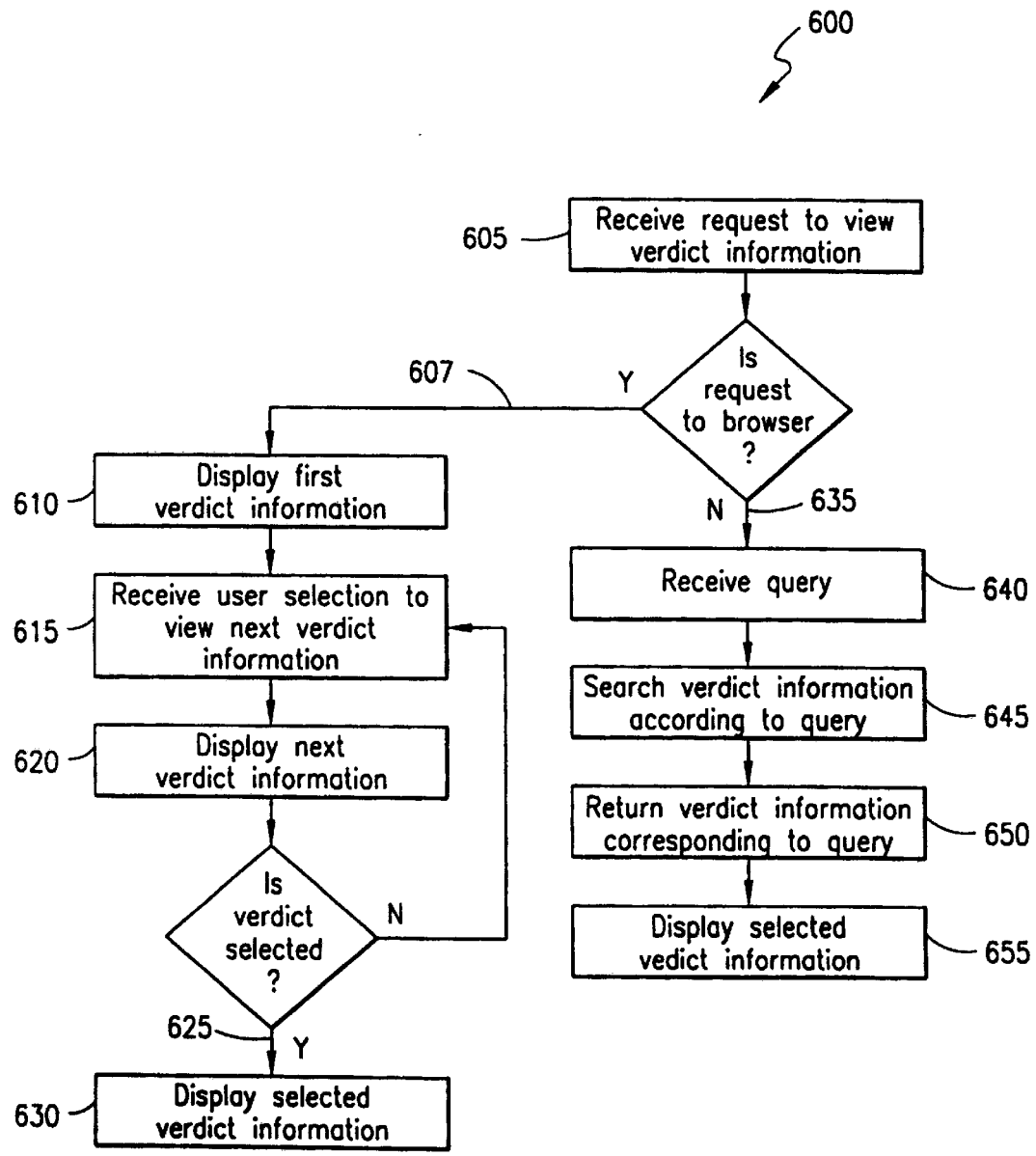
FIG. 6 illustrates the "Search Verdict Summaries" selectable feature.

Now referring to FIG. 6, there is illustrated the "Search Verdict Summaries" selectable feature 600. This feature allows users to search the previously stored verdict information (shown in FIG. 5). Initially, the system 55 receives (step 605) a request from the user to view, search or browse the verdict summaries. If the request is to browse the verdict summaries, branch 607 is followed and the user may be prompted to enter some sort of limiting criteria, e.g., type of case, dates, etc. The user, however, does not necessarily need to enter any limiting criteria.

In one embodiment, the user can simultaneously view a short blurb about numerous verdict summaries. In another embodiment, the user can view more detailed or even the entire verdict summary and merely scroll through the various summaries. For example, a first verdict summary (or portion thereof) can be displayed (step 610). The next verdict summary then can be displayed (step 615) responsive to a user input such as by depressing the "down arrow" key. This process is repeated until a particular verdict is selected (branch 625) and displayed for the users (step 630). The verdict summary also can be provided to the user through email, downloading, etc.

In addition to browsing the verdict summaries, a user can search the summaries (branch 635). For example, the user can enter a free-form search or a field search, e.g., type of case, that is received (step 640) by the system 55 (shown in FIG. 1). The system 55 searches (step 645) the verdict summaries according to the type of query received and returns (step 650) any matching verdict summaries. The user can then browse the summaries and select any that are of interest. The selected verdict summaries then are made available to the user (step 655).

Figure 7:
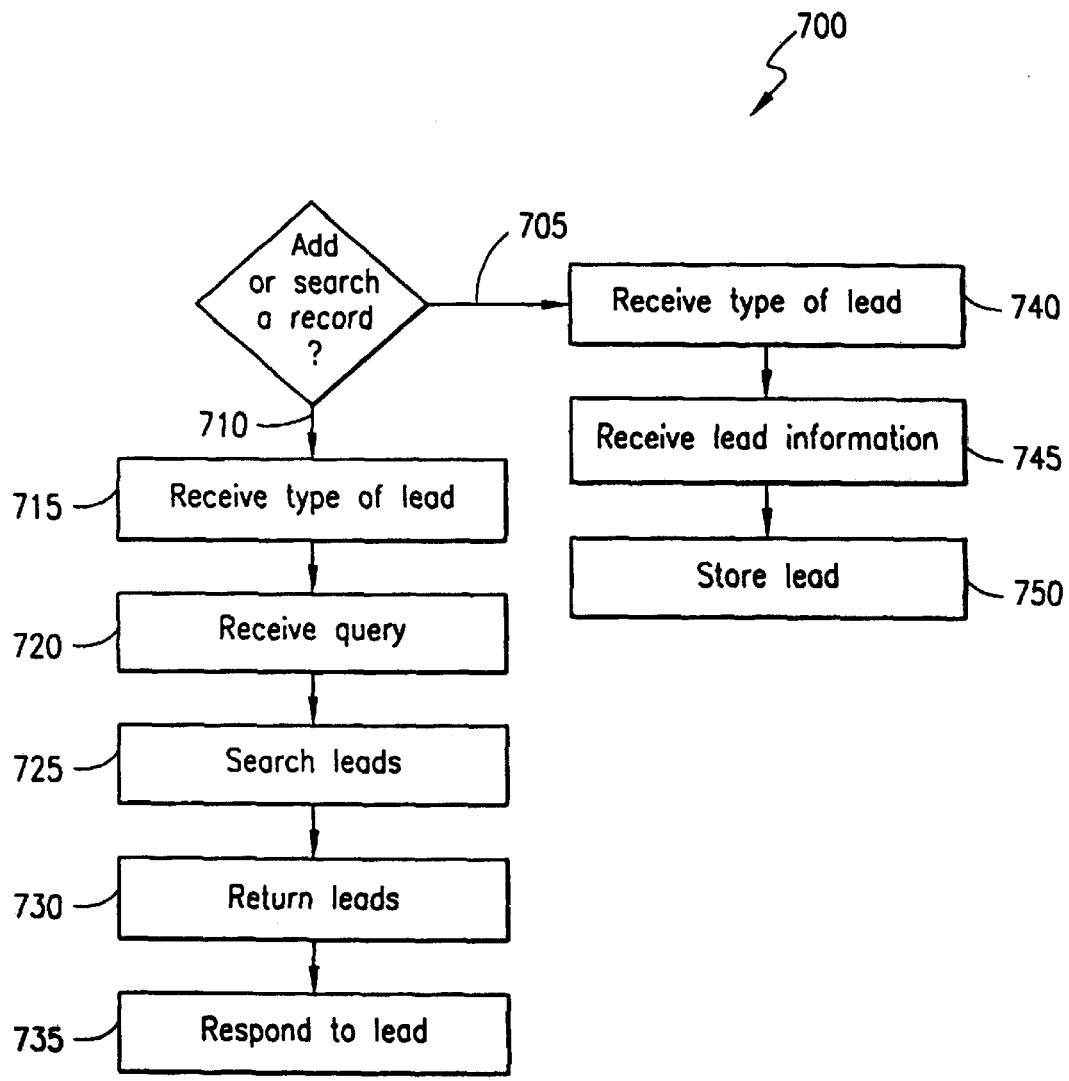
FIG. 7 illustrates the "Networking" selectable feature.

Referring now to FIG. 7, there is illustrated the "Networking" selectable feature 700. The "Networking" feature allows users to add and search leads. In particular, the "Networking" feature can allow posting and searching of information such as witness leads, etc.

In operation, a user must initially select whether to add a record (branch 705) or to search existing records (branch 710). If the user selects to search a record (branch 710), the user can be prompted to select a particular type of record (received by the system 55 at step 715) (shown in FIG. 1). Next, the user can either browse all individual entries within the selected type of record or enter (step 720) a query to locate particular entries. When a query is entered, the system will parse the query and search (step 725) the appropriate records accordingly. Moreover, the user can select a particular entry and respond (step 705) with comments or information.

Alternatively, if the user selects to add a record (step 735), the user can be first prompted to identify the type of lead (received in step 740). Next, the user transmits and the system 55 receives (step 745) the specific lead information. In one embodiment, the lead is indexed and stored (step 750) so that it can be searched or browsed in the future.

Figure 8:
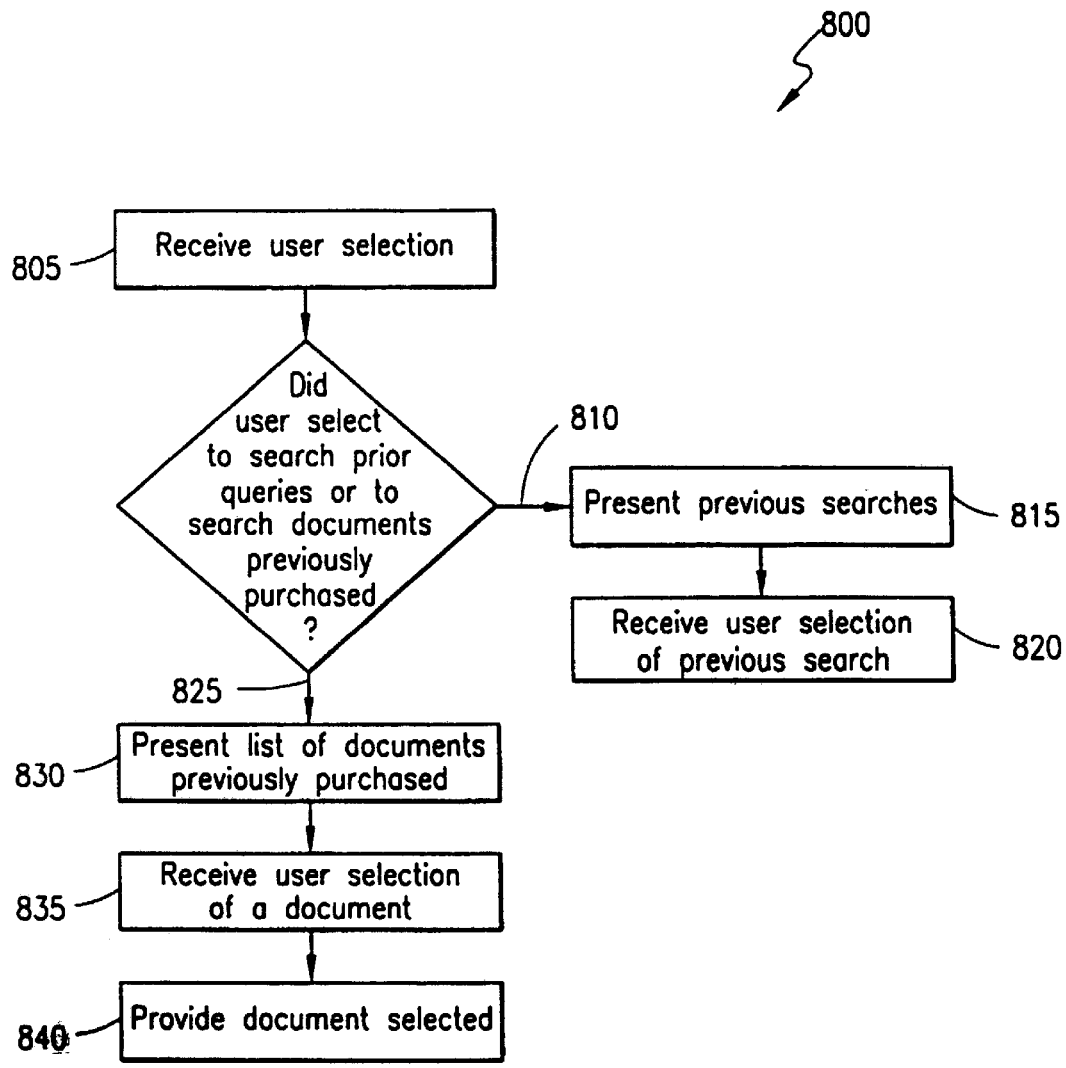
FIG. 8 illustrates the "Private File Area" selectable feature.

Referring now to FIG. 8, there is illustrated the "Private File Area" selectable feature 800. The "Private File Area" offers at least two functions: to present previous searches and to present previously purchased documents. For example, when a user selects (step 805) to search prior queries branch 810 is followed and the user is presented (step 815) with a list of all (or at least some of) the queries that the user has provided to the system. The queries can be organized by type, date, or any other way that is attractive to the user. Moreover, the user can then select a particular query (received by the system 55 in step 820) and have it run again or even modify it and then have it run again.

In addition to searching previously presented queries, the "Private File Area" presents users with the ability to view and reacquire documents previously purchased. For example, the user can select (branch 825) to view a list of documents that he previously purchased. The system will then present (step 830) that list and wait for the user to select a particular document. Upon selection (step 835), the document is provided (step 840) to the user—possibly at no fee or at a discounted fee.

Figure 9:
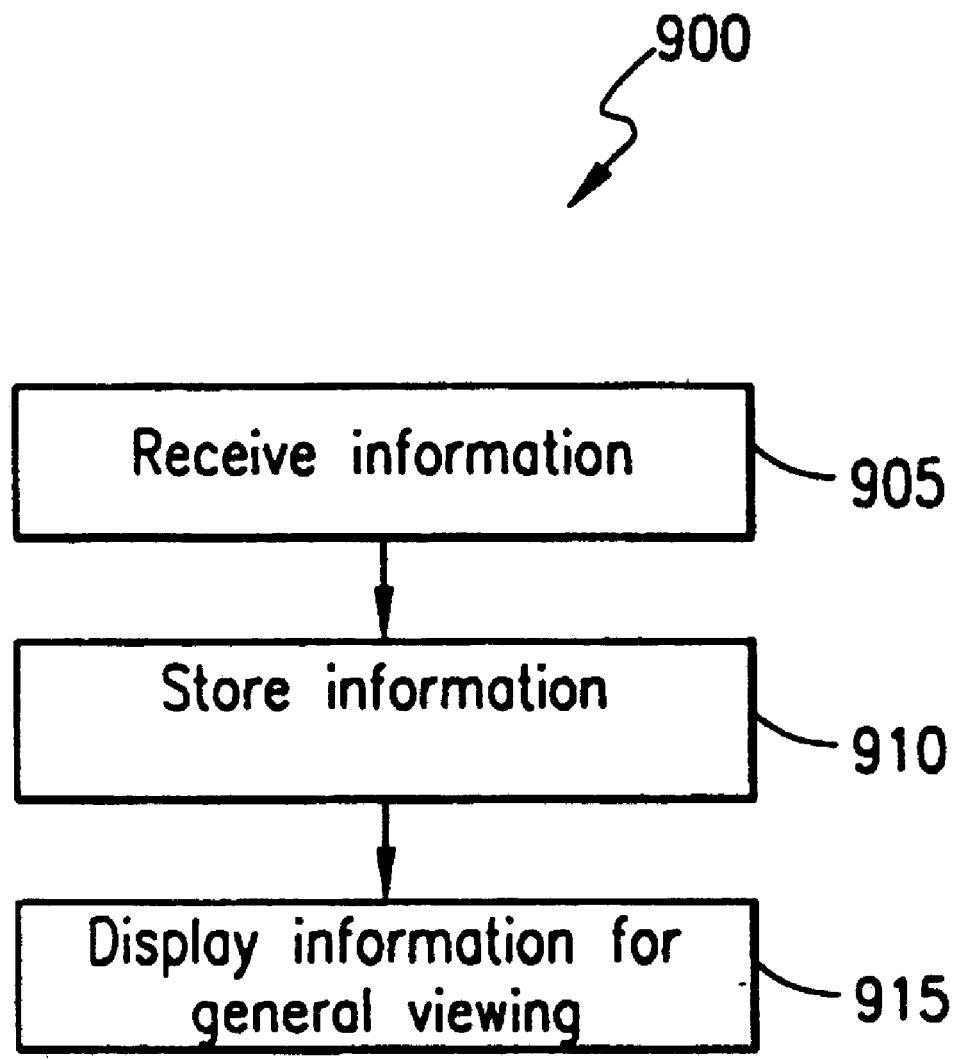
FIG. 9 illustrates the "Private Forums" selectable feature.

Referring now to FIG. 9, there is illustrated the "Private Forums" selectable feature 900. This feature acts as a type of electronic bulletin board. That is, the systems receive (step 905) information from a user, that information is stored (step 910) in the system, and the information is made available (step 915) for all other users (or some subset of other users) to view.

Figure 10:
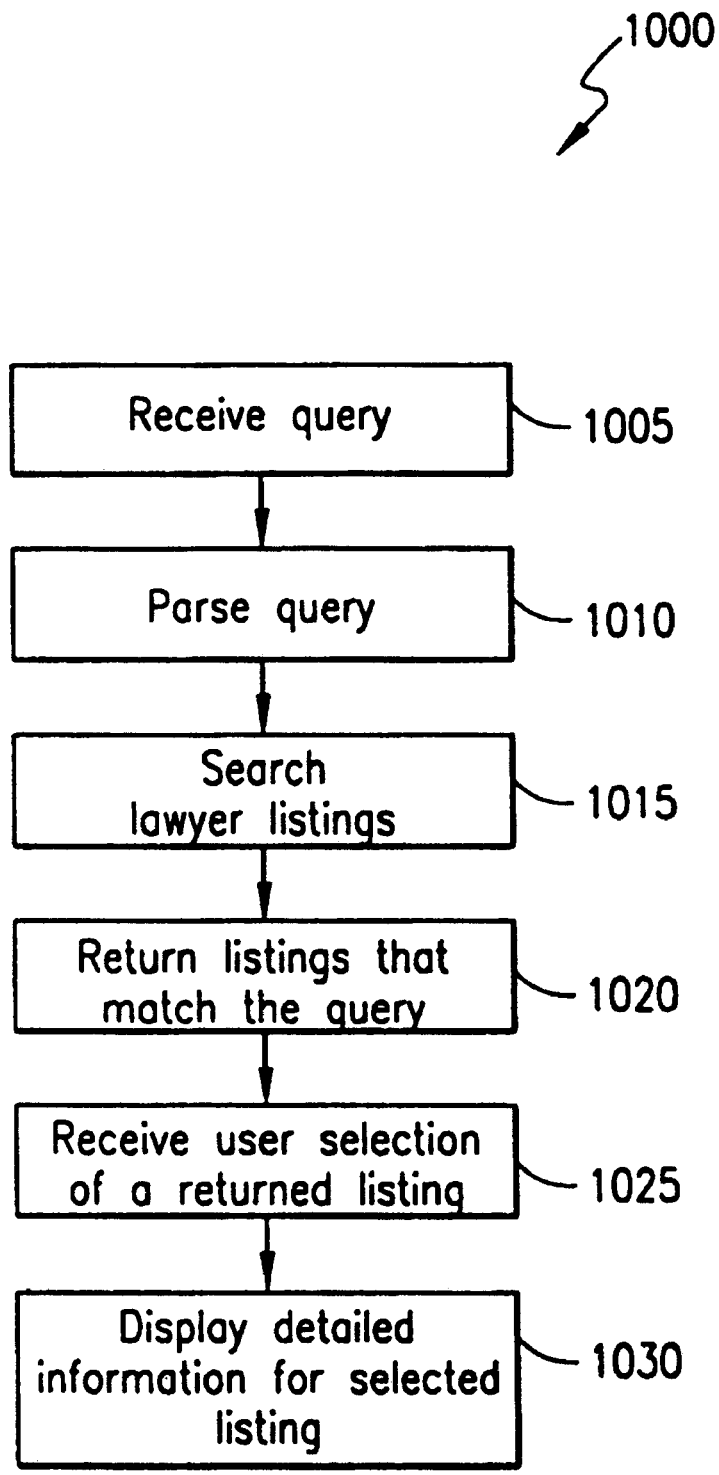
FIG. 10 illustrates the "Lawyer Referral" selectable feature.

Finally, FIG. 10 illustrates the "Lawyer Referral" selectable feature 1000. This feature allows users to search for lawyers in particular practice areas, regions, law firms, etc. For example, the user can present a query to the system 55 (received in step 1005). The query can be free-form or field based. If needed, the received query is parsed (step 1010) and then presented to the database. A listing of lawyers that match the query is then returned (step 1020). The user can select particular lawyers from the list (received at step 1025) and thereby receive (step 1030) more detailed information about the selected lawyer.

Based on the foregoing, it should be appreciated by those skilled in the art that the present invention advantageously provides a relational database system and associated method for managing various information objects useful to legal professionals. The relational database of the present invention provides the facility for inexpensively exchanging documents and at the same time, the ownership of such documents is maintained and monitored, for the purpose of calculating royalties, etc.

Although certain preferred exemplary embodiments of the present invention have been illustrated in the accompanying Drawings and described in the foregoing Description, it will be understood that the invention is not limited to the embodiments disclosed, but is capable of numerous rearrangements, modifications and substitutions without departing from the spirit of the invention as set forth and described herein above. Moreover, one skilled in the art can understand that any combination of the above described features can be used to create a device within the spirit of the invention.

What is claimed is:

1. A method of providing secure access to data objects, said method comprising the steps of:

providing data objects to a central database, wherein the data objects are owned by one or more distinct entities, said step of providing data objects further comprising the step of:

indexing data objects in accordance with attributes, wherein the attributes include (A) type of data objects, (B) originator of the data objects, (C) owner of the data objects, and (D) one or more of: plaintiff lawyer ID, defense lawyer ID, defense lawyer's name, plaintiff lawyer's name, and state code; and providing information concerning one or more of the data objects to a user in response to a query made by the user, said step of providing information further comprising the steps of:

receiving the query over a computer network;

using the query to identify attributes for data objects sought by the user;

identifying the information based on the identification; and transmitting the document back to the user over the computer network if the user is permitted access to the information.

2. The method of claim 1, wherein said step of indexing further comprises the steps of:

associating an object type with each type of data object;

storing a copy of the object in an object repository; and extracting a plurality of attributes from the object for purposes of managing the object.

3. A computerized method for data management, the computerized method comprising the steps of:

receiving a first query from a first user for querying data objects, the data objects indexed in accordance with attributes, wherein the attributes include (A) type of data objects, (B) originator of the data objects, (C) owner of the data objects, and (D) one or more of: plaintiff lawyer id, defense lawyer id, defense lawyer's name, plaintiff lawyer's name, and state code;

receiving a first user identity indicator;

storing the first query and the first user identity indicator in a first database;

receiving a second query from a second user, the second query including at least a portion of the first query;

searching the first database according to the second query; and responsive to searching the first database, returning the first query and the first user identity indicator.

4. The computerized method of claim 3, wherein the first database and the second database are different.

5. A system for data management, the system comprising:

a processor;

a storage device connected to the processor;

instructions contained on the storage device, the instructions configured to be readable from the storage device by the processor and thereby cause the processor to operate as to:

accept a first query from a first user for querying data objects, the data objects indexed in accordance with attributes, wherein the attributes include (A) type of data objects, (B) originator of the data objects, (C) owner of the data objects, and (D) one or more of: plaintiff lawyer id, defense lawyer id, defense lawyer s name, plaintiff lawyer's name, and state code;

accept a first user identity indicator, store the first query and the first user identity indicator in a first database;

accept a second query from a second user, the second query including at least a portion of the first query;

initiate searching of the first database according to the second query; and responsive to searching the first database, return the first query and the first user identity indicator.

6. The system of claim 5, wherein the first user and the second user are different.

* * * * *